(12) United States Patent
Yermakov

(10) Patent No.: US 10,601,849 B2
(45) Date of Patent: Mar. 24, 2020

(54) LOW-COMPLEXITY DETECTION OF POTENTIAL NETWORK ANOMALIES USING INTERMEDIATE-STAGE PROCESSING

(71) Applicant: Level 3 Communications, LLC, Broomfield, CO (US)

(72) Inventor: Sergey Yermakov, Littleton, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 142 days.

(21) Appl. No.: 15/685,827

(22) Filed: Aug. 24, 2017

(65) Prior Publication Data

US 2019/0068623 A1 Feb. 28, 2019

(51) Int. Cl.
*H04L 29/06* (2006.01)
*H04L 12/26* (2006.01)
*H04L 12/24* (2006.01)
*G06F 21/57* (2013.01)
*G06F 21/55* (2013.01)
*H04L 12/851* (2013.01)

(52) U.S. Cl.
CPC ........ *H04L 63/1425* (2013.01); *G06F 21/577* (2013.01); *H04L 41/142* (2013.01); *H04L 41/147* (2013.01); *H04L 43/026* (2013.01); *H04L 43/062* (2013.01); *H04L 63/0236* (2013.01); *H04L 63/1416* (2013.01); *H04L 63/1458* (2013.01); *G06F 21/552* (2013.01); *H04L 43/16* (2013.01); *H04L 47/2441* (2013.01)

(58) Field of Classification Search
CPC ............. H04L 63/1425; H04L 63/1416; H04L 63/1458; H04L 47/2441
See application file for complete search history.

(56) References Cited

U.S. PATENT DOCUMENTS

| | | | |
|---|---|---|---|
| 8,510,821 B1* | 8/2013 | Brandwine | H04L 63/1416 709/229 |
| 8,762,298 B1* | 6/2014 | Ranjan | G06N 5/02 706/12 |
| 9,049,221 B1* | 6/2015 | Yen | H04L 63/1408 |
| 10,200,262 B1* | 2/2019 | Leverich | H04L 43/0823 |
| 10,237,294 B1* | 3/2019 | Zadeh | H04L 63/1425 |
| 10,552,728 * | 2/2020 | Oliner | G06N 3/0445 |
| 2002/0031134 A1* | 3/2002 | Poletto | H04L 43/00 370/401 |

(Continued)

OTHER PUBLICATIONS

Salem, O., Naït-Abdesselam, F. and Mehaoua, A., Jun. 2012, Anomaly detection in network traffic using jensen-shannon divergence. In 2012 IEEE International Conference on Communications (ICC) (pp. 5200-5204). IEEE. (Year: 2012).*

*Primary Examiner* — James R Turchen

(57) ABSTRACT

In an embodiment, a computer implemented method receives flow data for a network flows. The method extracts a tuple from the flow data and calculates long-term and short-term trends based at least in part on the tuple. The long-term and short-term trends are compared to determine whether a potential network anomaly exists. If a potential network anomaly does exist, the method initiates a heavy hitter detection algorithm. The method forms a low-complexity intermediate stage of processing that enables a high-complexity heavy hitter detection algorithm to execute when heavy hitters are likely to be detected.

12 Claims, 4 Drawing Sheets

(56) References Cited

U.S. PATENT DOCUMENTS

| | | | |
|---|---|---|---|
| 2003/0005258 A1* | 1/2003 | Modha | G06K 9/6223 712/1 |
| 2003/0145231 A1* | 7/2003 | Poletto | H04L 63/1408 726/22 |
| 2007/0011741 A1* | 1/2007 | Robert | H04L 43/00 726/22 |
| 2007/0088845 A1* | 4/2007 | Memon | H04L 47/10 709/234 |
| 2008/0208526 A1* | 8/2008 | Thibaux | G06K 9/00536 702/176 |
| 2010/0004976 A1* | 1/2010 | Faure | G06Q 10/04 705/7.31 |
| 2010/0027432 A1* | 2/2010 | Gopalan | H04L 41/142 370/252 |
| 2010/0082513 A1* | 4/2010 | Liu | H04L 63/1458 706/46 |
| 2010/0153316 A1* | 6/2010 | Duffield | G06F 21/552 706/12 |
| 2011/0196964 A1* | 8/2011 | Natarajan | H04L 41/0604 709/224 |
| 2011/0238855 A1* | 9/2011 | Korsunsky | G06F 21/55 709/231 |
| 2012/0016886 A1* | 1/2012 | Cohen | G06F 17/18 707/748 |
| 2013/0117847 A1* | 5/2013 | Friedman | H04L 47/20 726/22 |
| 2013/0282331 A1* | 10/2013 | Cohen | G06F 17/18 702/179 |
| 2015/0156213 A1* | 6/2015 | Baker | H04L 63/1416 726/23 |
| 2015/0200960 A1* | 7/2015 | Dickinson | H04L 63/1416 726/23 |
| 2016/0142266 A1* | 5/2016 | Carroll | H04L 41/16 706/12 |
| 2016/0149949 A1* | 5/2016 | Labrou | H04L 47/2441 726/23 |
| 2016/0350173 A1* | 12/2016 | Ahad | H04L 67/02 |
| 2017/0070521 A1* | 3/2017 | Bailey | G06F 16/9535 |
| 2017/0099226 A1* | 4/2017 | Vasseur | H04L 47/826 |
| 2017/0099312 A1* | 4/2017 | Ganame | H04L 63/1425 |
| 2017/0208077 A1* | 7/2017 | Freedman | G06F 16/24568 |
| 2017/0230391 A1* | 8/2017 | Ferguson | G06N 7/005 |
| 2017/0353477 A1* | 12/2017 | Faigon | H04L 63/1416 |
| 2018/0013681 A1* | 1/2018 | Kohout | H04L 67/02 |
| 2018/0027006 A1* | 1/2018 | Zimmermann | H04L 63/0227 726/11 |
| 2018/0139141 A1* | 5/2018 | Stepanek | H04L 47/2441 |
| 2018/0205750 A1* | 7/2018 | Kohout | H04L 63/1425 |
| 2018/0219889 A1* | 8/2018 | Oliner | G06N 3/08 |
| 2018/0278629 A1* | 9/2018 | McGrew | G06N 20/00 |
| 2018/0288081 A1* | 10/2018 | Yermakov | H04L 63/1458 |
| 2018/0288083 A1* | 10/2018 | Yermakov | H04L 63/1425 |
| 2019/0014134 A1* | 1/2019 | Kopp | G06F 3/01 |
| 2019/0020663 A1* | 1/2019 | Bartos | H04L 43/08 |
| 2019/0020670 A1* | 1/2019 | Brabec | G06N 7/005 |

* cited by examiner

LOW-COMPLEXITY DETECTION OF POTENTIAL NETWORK ANOMALIES USING INTERMEDIATE-STAGE PROCESSING

BACKGROUND

Technical Field

This field generally relates to monitoring network activities. More specifically, embodiments relate to network anomaly detection.

Background

A communication network may, for example, provide a network connection that allows data to be transferred between two geographically remote locations. A network may include network elements connected by links. The network elements may be any type of managed device on the network, including routers, access servers, switches, bridges, hubs, IP telephones, IP video cameras, computer hosts, and printers. Network elements can be physical or logical and can communicate with one another via interconnected links.

Network anomalies in a communication network may occur for various reasons. For example, the number of network flows created by an individual user may appear usually high on a network device. Such high number of network flows could be an indication that the user has initiated a denial-of-service (DOS) attack. Algorithms to detect such attacks may be computationally expensive and require large amounts of memory.

SUMMARY

In an embodiment, an anomaly detection system performs intermediate processing on network flow data to detect a potential anomaly and determine whether to initiate execution of anomaly detection algorithms. The system receives flow data for one or more flows that correspond to a device-circuit pair. The system parses the flow data to focus on a subset of the available fields, and normalizes the parsed data. The system calculates statistics using the normalized and parsed data for the most recent time frame, producing a short-term trend. The system also calculates statistics using the normalized and parsed data for an aggregate of a plurality of recent time frames, producing a long-term trend. The system then compares the long-term trend to the short-term trend to detect a potential anomaly. Upon detection of a potential network anomaly, the system initiates a more robust anomaly detection algorithm to determine whether a network anomaly exists.

Computer-implemented method and computer-readable medium embodiments are also disclosed.

Further embodiments and features, as well as the structure and operation of the various embodiments, are described in detail below with reference to accompanying drawings.

BRIEF DESCRIPTION OF THE DRAWINGS

The accompanying drawings are incorporated herein and form a part of the specification.

In the drawings, like reference numbers generally indicate identical or similar elements. Generally, the left-most digit(s) of a reference number identifies the drawing in which the reference number first appears.

DETAILED DESCRIPTION

Network anomaly detection (AD) systems monitor networks for unusual events or trends. Some network anomaly detection systems perform computationally complex algorithms that process network flow data (e.g., netflow data) to identify heavy hitters (e.g., Internet Protocol (IP) addresses that account for an outsized number of flows in the network). Such heavy hitter algorithms include lossy counting, probabilistic lossy counting, and sketch algorithms. For example, in a lossy counting algorithm, the most frequently appearing source IP in network flow data is calculated for fixed segments of time. If the same source IP appears as the most frequently appearing source IP for two consecutive segments, a counter is increased. By identifying heavy hitters, network anomaly detection systems can detect and mitigate denial of service (DoS) attacks.

Heavy hitter detection algorithms are expensive in terms of computational resources, such as processing time and memory. Thus, in networks where DoS attacks are relatively rare, continuous execution of heavy hitter detection algorithms is inefficient. The present disclosure introduces an intermediate stage of processing that utilizes low-complexity computations on relatively small data sets to detect potential anomalies. With such an intermediate stage, the high-complexity heavy hitter detection algorithm can be initiated and run during periods where a heavy hitter is more likely to be detected, efficiently using computational and memory resources.

Figure 1:
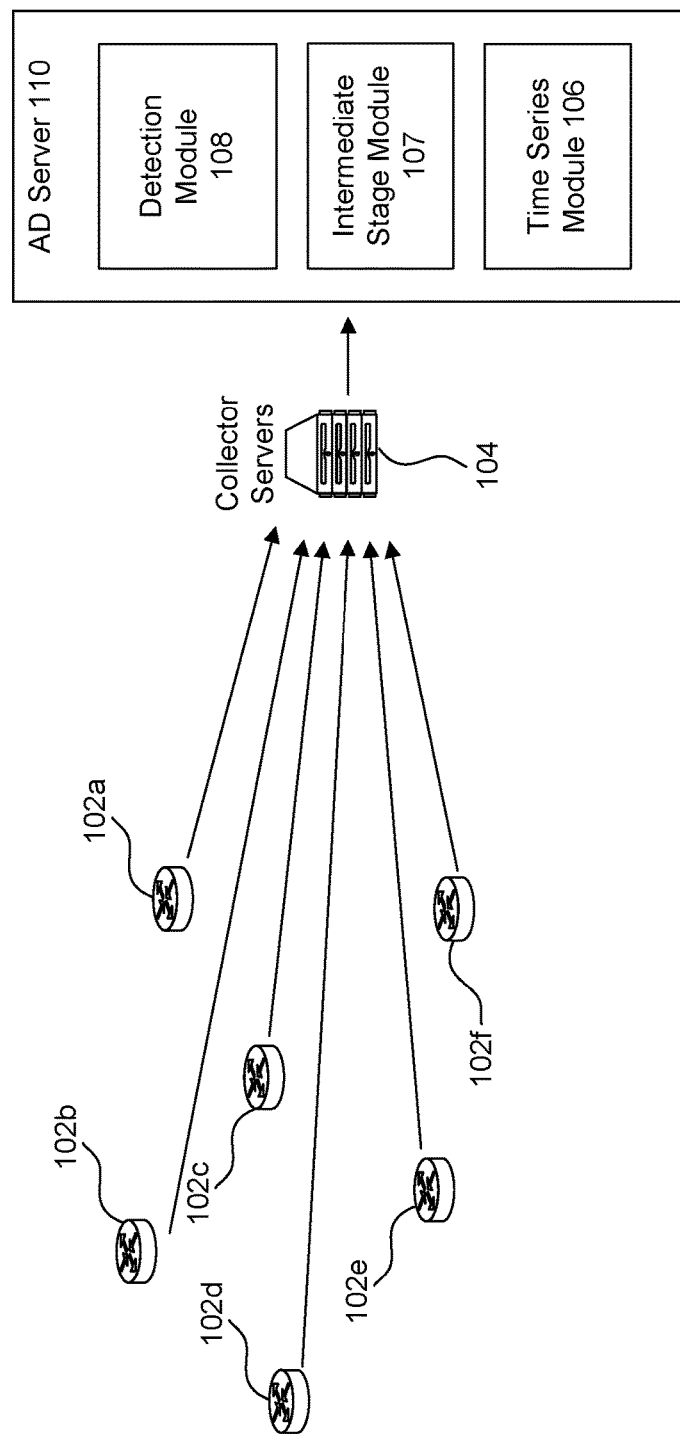
FIG. 1 illustrates an example system architecture for network anomaly detection including intermediate-stage processing.

FIG. 1 is a diagram illustrating an example system 100 for creating aggregate network flow time series for network anomaly detection. System 100 includes network devices 102a-102f, one or more collector servers 104, and anomaly detection (AD) server 110. Network devices 102a-102f may be any hardware devices that mediate data in a computer network. Network devices 102a-102f may be gateways, routers, network bridges, modems, wireless access points, networking cables, line drivers, switches, hubs, and repeaters. Network devices 102a-102f may also include hybrid network devices such as multilayer switches, protocol converters, bridge routers, proxy servers, firewalls, network address translators, multiplexers, network interface controllers, wireless network interface controllers, ISDN terminal adapters, and other related hardware.

Network devices 102a-102f are configured to enable network flow data collection, and may send network flow data (e.g., netflow data) to one or more collector servers 104. One or more collector servers 104 may analyze the network flow data and forward the network flow records (e.g., netflow records) to AD server 110 for network anomaly detection. AD server 110 includes three modules: time series module 106, intermediate stage module 107, and detection module 408.

Time series module 106 may receive network flow data that correspond to a device-circuit pair. As described in further detail below relative to FIGS. 2 and 3, time series module 106 may parse the received network flow data to extract a subset of data from the received network flow data to be used by the low-complexity intermediate stage 106, assign that data to one or more time buckets, and determine whether a time bucket is complete. In some embodiments, when time series module 106 determines that a time bucket is complete, time series module 106 normalizes the data corresponding to the time bucket and sends the normalized data to intermediate stage module 107 to detect potential network anomalies. Alternatively, intermediate stage module 107 may perform the data extraction and normalization after receiving network flow data for a complete bucket from the time series module 106.

Intermediate stage module 107 may perform low-complexity computations on relatively small data sets to detect potential anomalies before initiating a computationally expensive heavy hitter detection algorithm. As discussed below relative to FIGS. 2 and 3, intermediate stage module 107 may observe and compare short-term and long-term statistics of network flow data to determine whether a potential network anomaly exists in the network. For example, if the short-term statistics of network flow data significantly diverge from the long-term statistics of network flow data, intermediate stage module 107 may determine a potential network anomaly exists in the network and initiate heavy hitter anomaly detection in detection module 108.

Detection module 108 may run any type of heavy hitter anomaly detection algorithm and may be able to initiate action based on detection of a heavy hitter. For example, based on the network flow data corresponding to the time buckets, detection module 108 may determine that the number of network flows are too high for a specific time period, which could indicate that a subscriber has initiated a DOS attack. The time series module 106 may be capable of adjusting its operation based on the heavy hitter anomaly detection algorithm employed in detection module 108.

Detection module 108 may be any type of anomaly detection system. The system may be taught to recognize normal system activity. Anomalies may be detected in several ways, including with artificial intelligence type techniques, such as neural networks. Another method is to define what normal usage of the system comprises using a strict mathematical model, and flag any deviation from this as an attack. Other techniques used to detect anomalies include data mining methods, grammar based methods, and Artificial Immune System. Example anomaly detection systems include the SECURITY THREAT RESPONSE MANAGER system available from Juniper Networks of Sunnyvale, Calif., the RIVERBED CASCADE system available from Riverbed Technology of San Francisco, Calif., and the SYMANTEC ADVANCED THREAT DETECTION SYSTEM available from Symantec of Sunnyvale, Calif.

FIG. 1 illustrates an embodiment where time series module 106 is a component of AD server 110. In another embodiment, time series module 106 is a component of a separate server located between one or more collector servers 104 and AD server 110. In yet another embodiment, time series module 106 is a component of one of the collector servers 104.

Similarly, FIG. 1 illustrates an embodiment where intermediate stage module 107 is a component of AD server 110. In another embodiment, intermediate stage module 107 is a component of a separate server located between one or more collector servers 104 and AD server 110. In yet another embodiment, intermediate stage 106 is a component of one of the collector servers 104.

Figure 2:
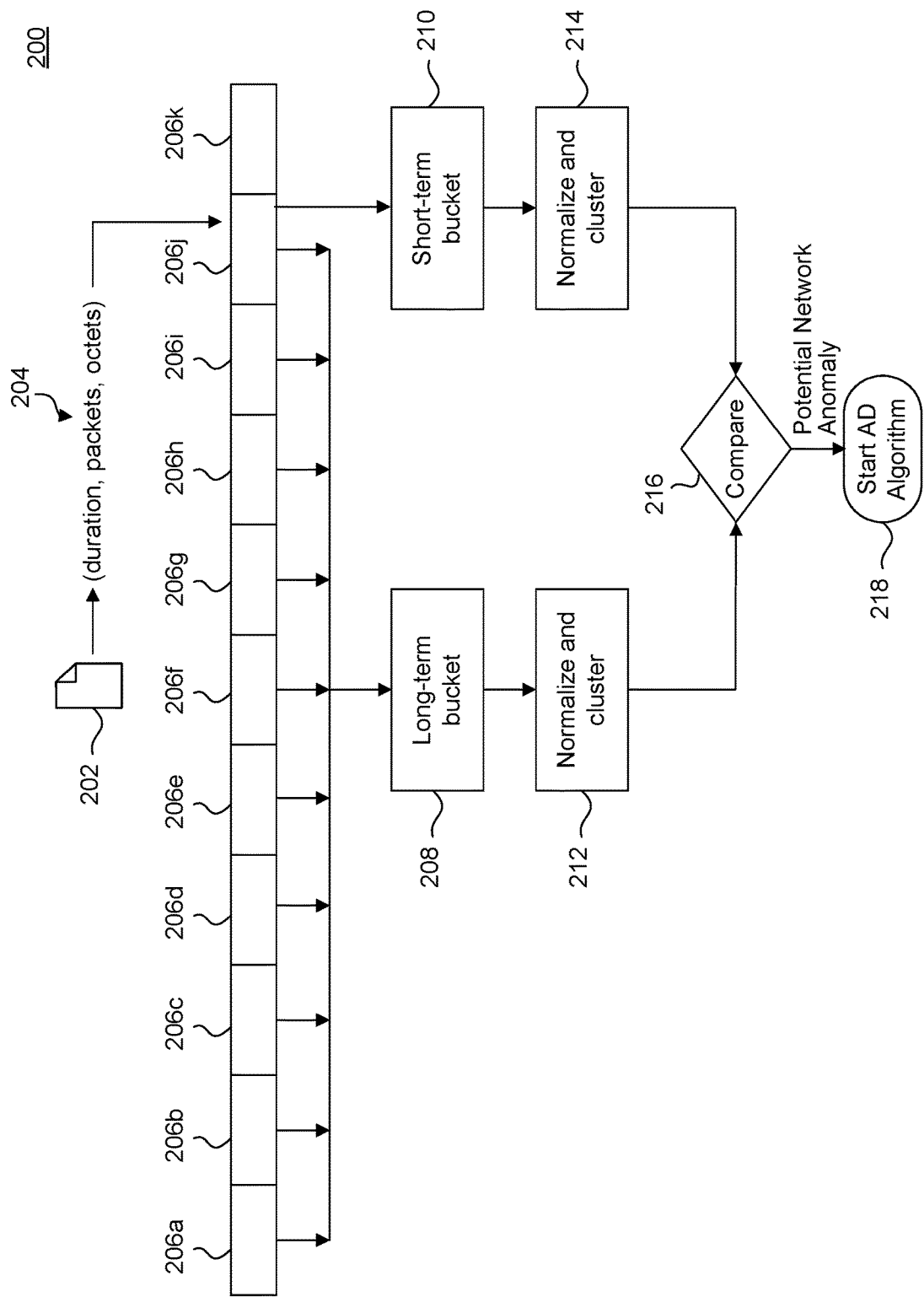
FIG. 2 illustrates an example data flow in a network anomaly detection system employing intermediate-stage processing.

FIG. 2 illustrates an example data flow 200 in a network anomaly detection system employing intermediate-stage processing, such as system 100 shown in FIG. 1. A network flow record 202 (e.g., netflow record) containing flow data is received, for example by time series module 106. A network flow record 202 may contain data related to one or more network flows. For example, the time series module 106 may receive a network flow record 202 from one or more flow collector servers 104 that collect network flow data from network devices 102a-102f.

Network flow data, as the term is used herein, is not limited to data from a particular brand or type of router. The network flow data may include a network flow record 202 for each data flow. Each data flow may be one or more packets in time proximity with one another having a common protocol identified via Internet Protocol (IP) addresses and Transport Control Protocol (TCP) or User Datagram Protocol (UDP) ports. The network devices 102a-102f determine that a flow has ended, for example when a certain amount of time passes after receipt of a packet having the aforementioned characteristics. If, after the certain amount of time passes, for example, the network devices 102a-102f receive additional packets with these characteristics, the network devices 102a-102f may regard the packets as belonging to a new data flow and may represent them with a new network flow record 202. Each network flow record 202, such as a netflow record, may include, but is not limited to, the data flow's (1) source and destination IP addresses, (2) source port number and destination port number, (3) type of layer 3 protocol (e.g., TCP or UDP), (4) start and end times, (5) size (e.g., number of octets or packets), and (6) input logical interface (ifindex). The last field, input logical interface, is also called a circuit, which can be used to identify a user (e.g., a subscriber to the network services provided by a service provider).

Network flow data collection functionality may be configured on a per-interface basis on a network device 102a-102f. For instance, for some versions of CISCO routers, the ip flow ingress command can be used to enable netflow on an interface. The ip flow-export destination <address> <port> command may be used to configure where the netflow data is exported.

In this way, network flow data can summarize certain characteristics of a data flow. Each flow record is created by identifying packets with similar flow characteristics and counting or tracking the packets and bytes per flow. The flow details or cache information is exported to a flow collector server 104 periodically based upon flow timers. Expired flows may be grouped together into datagrams, such as "netflow export" datagrams, for export.

From the received network flow record 202, the time series module 106 may identify flow data for one or more flows that correspond to the device-circuit pair. As described above, a circuit (i.e., input logical interface) can be used to identify a user. Further, when the time series module receives a network flow record 202 that a network device 102a-102f exports to a collector server 104, the time series module 106 can identify the network device 102a-102f that exports the network flow record 202. In this way, the time series module may determine a device-circuit pair that corresponds to a user for a network device 102a-102f.

A 3-tuple 204 may be extracted from one or more network flow records 202. In an embodiment, the 3-tuple 204 comprises a time duration of the flow, the number of packets transmitted during the flow, and the number of octets transmitted during the flow. Note that the 3-tuple 204 in this example does not comprise information that would allow identification of a user or a network device 102a-102f. The 3-tuple may be designed to provide enough information to enable analysis of the short-term and long-term trends of the flows in the network, but without occupying the large amounts of memory required for heavy hitter detection algorithms.

A 3-tuple 204 may be assigned to one or more buckets 206a-206k. In the illustrated example, 3-tuple 204 is assigned to bucket 206j. The buckets 206a-206k correspond to time segments and thus have a chronological ordering. For example, bucket 206a may correspond to a time segment occurring before a time segment corresponding to bucket 206b. In this sense, bucket 206a may be said to be "before" or "earlier" than bucket 206b.

In one embodiment, buckets 206a-206k correspond to consecutive 5-minute time segments. However, the duration of a time segment can be tuned to optimize performance. For example, longer time segments allow for the collection of more data in each bucket, and thus a better view of trends, but may result in missed short-term trends that occur on shorter time spans than the time segment. As an example, a DoS attack lasting one minute may not be detected using time segments of five minutes. Further, even if such attacks are detected, several minutes have passed by the time they are identified, rendering it too late to identify the heavy hitter or mitigate the attack.

Because flows are not confined to a segmented structure, a flow corresponding to a given 3-tuple 204 may overlap multiple buckets. In such a case, the 3-tuple 204 may be assigned to more than one bucket. For these same reasons, a bucket may be assigned incoming 3-tuples 204 even after the time segment corresponding to that bucket has passed. After some short delay time, however, a bucket can be declared complete such that no new 3-tuples will be assigned to that bucket.

Short-term network flow characteristics may be observed using the data in the most recently completed bucket 210, whereas long-term network flow characteristics may be observed by aggregating several of the most recently completed buckets into a long-term bucket 208. In the illustrated example, the ten most recently completed buckets 206a-206j are aggregated into a long-term bucket 208. Note that, in the illustrated example, once bucket 206k is complete, it will become the short-term bucket 210, and the long-term bucket will comprise buckets 206b-206k.

In an embodiment, the data in the long-term bucket 208 is normalized 212 such that the largest value for any term in a 3-tuple in the long-term bucket 208 is equal to 1, and all other values are between 0 and 1. For example, if one 3-tuple contains a larger duration, more packets, and more octets than any other 3-tuple in the long-term bucket 208, then that 3-tuple is normalized to be equal to (1, 1, 1).

The normalized 3-tuples in the long-term bucket 208 are then processed 212 using a clustering algorithm such that the normalized 3-tuples are classified into distinct clusters. Clustering is described below relative to FIGS. 4A and 4B.

Similarly, in an embodiment, the data in the short-term bucket 210 is normalized 214 such that the largest value for any term in a 3-tuple in the short-term bucket 208 is equal to 1, and all other values are between 0 and 1. For example, if one 3-tuple contains a larger duration, more packets, and more octets than any other 3-tuple in the short-term bucket 210, then that 3-tuple is normalized to be equal to (1, 1, 1). The normalized 3-tuples in the short-term bucket 210 are then processed 214 using a clustering algorithm such that the normalized 3-tuples are classified into distinct clusters.

The long-term trend and short-term trend, which may be measured using clustering algorithms, are compared 216 in the illustrated example. The comparison 216 may result in identification of a potential network anomaly when the short-term trend is significantly different than the long-term trend. Moreover, the specific variation of the short-term trend from the long-term trend may provide insight into what type of network anomaly exists. For example, a short-term trend exhibiting a significant increase in short-duration flows than the long-term trend may indicate a DoS attack. Conversely, a short-term trend exhibiting a significant increase in long-duration, large-packet flows compared to the long-term trend may indicate a wide-spread download anomaly where many users are downloading large amounts of information at the same time. Detection of a potential anomaly, or a specific type of anomaly such as a potential DoS attack, by comparison 216 may result in initiation of a high-complexity AD algorithm such as a heavy hitter detection algorithm.

The data flow and blocks illustrated in FIG. 2 may be performed by various components of the network anomaly detection system, such as network devices 102a-102f, collector servers 104, time series module 106, intermediate stage module 107, or detection module 108. For example, the extraction of 3-tuples 204 can occur at any of network devices 102a-102f, collector servers 104, time series module 106, or intermediate stage module 107.

Figure 3:
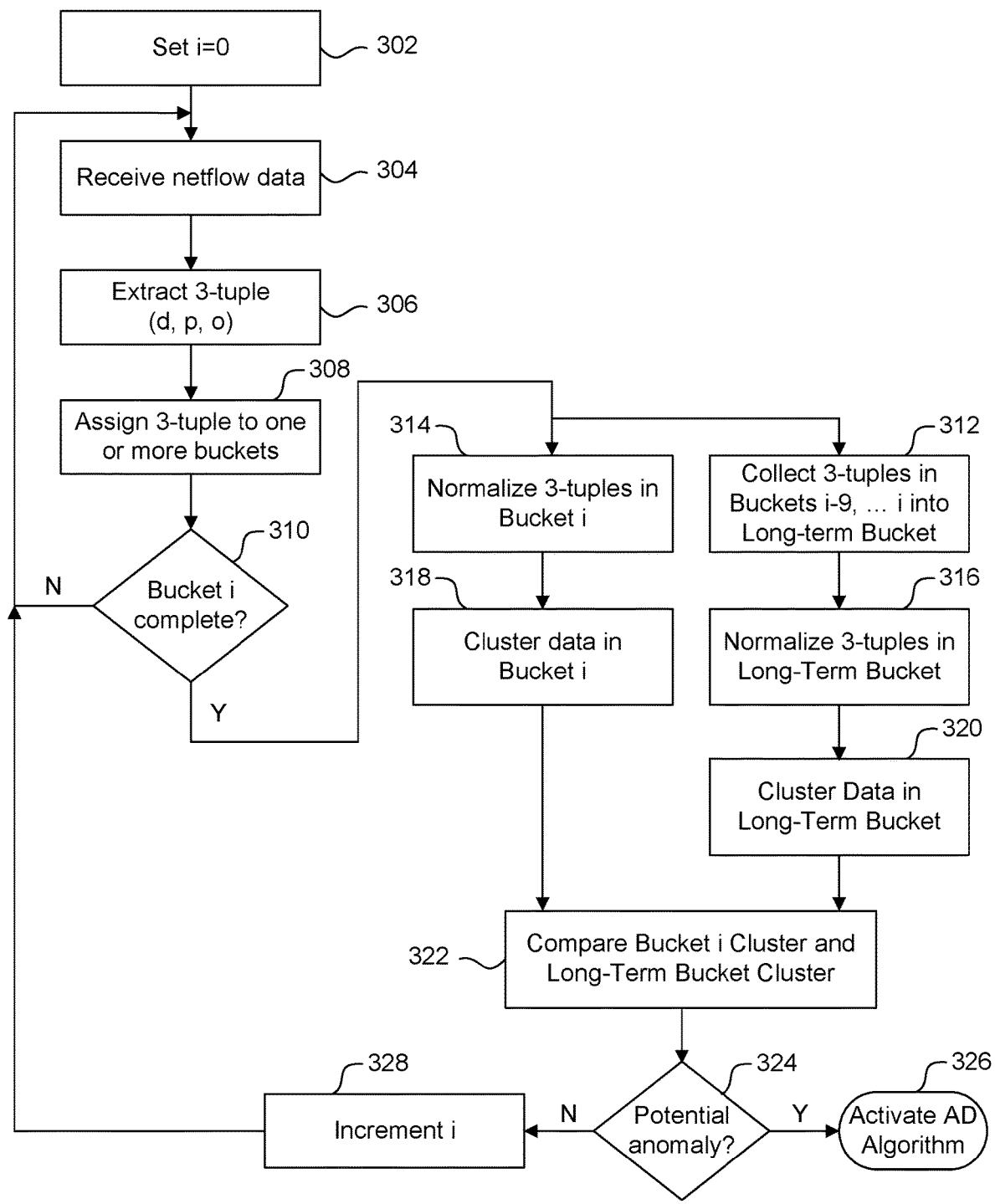
FIG. 3 is a flowchart illustrating an exemplary method for performing intermediate processing on network flow data to detect potential network anomalies according to one embodiment.

FIG. 3 is a flowchart illustrating an exemplary method 300 for performing intermediate processing on network flow data to detect potential network anomalies according to one embodiment. Although the method 300 iterates over a plurality of buckets using the iterator i, the use of such an iterator is for illustrative purposes only, and a skilled artisan would understand that the processes illustrated in method 300 could be performed without an iterator. In method 300 illustrated in FIG. 3, the iterator i refers to the next bucket to serve as the source for short-term trend data. Method 300 begins by setting iterator i=0 at step 302. This assignment is illustrative, however, and the iterator, if used, could be set to any value such that the method progresses through buckets corresponding to time segments.

The method 300 proceeds by receiving network flow data (e.g., netflow data) at step 304. For example, as discussed above relative to FIGS. 1-2, the time series module 106 may receive 304 netflow data from one or more collector servers 104. At step 306, the netflow data may be parsed to extract a subset of information. For example, the duration (d), number of packets (p), and number of octets (o) of a flow may be extract from netflow data to form a 3-tuple (d, p, o), and other information in the netflow data such as identifying information may be disregarded in an effort to conserve memory.

At step 308, the 3-tuple is assigned to one or more buckets. As previously discussed with respect to FIG. 2, flows are not restricted to a single time segment, and thus may be considered as belonging to more than one bucket. For example, the most recently received 3-tuple may not be assigned to bucket i, but rather could be assigned to buckets i+1 and i+2. However, in the illustrated embodiment, the received 3-tuple would not be assigned to bucket i−1 because bucket i−1 has been determined to be complete. At step 310, bucket i is tested for "completeness" such that no further 3-tuples can be assigned to it.

If bucket i is not complete, then processing continues at 304 with reception of further netflow data. If bucket i is complete, then processing of long-term and short-term trends begins. The processing performed on short-term data and long-term data may be the same, albeit on different data sets. For example, the short-term trend may consider the most recently completed bucket, which in the illustrated embodiment is bucket i. The long-term trend may consider data from the 10 most recently completed buckets, which in the illustrated embodiment are buckets i−9, . . . i. This long-term data may be collected into a long-term bucket at 312.

At steps 314 and 316, the short-term and long-term data, respectively, are normalized. As discussed above relative to FIG. 2, normalization results in data between 0 and 1, inclusive. For example, the number of packets (p) in each 3-tuple may be normalized by the largest value in the respective bucket (short-term or long-term), such that the 3-tuple with the most packets (p) in the long-term bucket will have a (p) value of 1. However, other normalization techniques could be used within the scope of the present disclosure. At steps 318 and 320, the normalized 3-tuples in the short-term and long-term buckets, respectively, may be classified into distinct clusters using a clustering algorithm. Clustering is discussed below relative to FIGS. 4A and 4B.

At step 322, the long-term clusters and short-term clusters are compared. For example, the comparison 322 may compare the percentage of flows assigned to certain clusters to determine that a potential network anomaly exists. The comparison 322 may result in identification of a potential network anomaly when the short-term trend is significantly different than the long-term trend. Moreover, the specific variation of the short-term trend from the long-term trend may provide insight into what type of network anomaly exists. In one embodiment, one cluster in the short-term bucket represents short-lived, low-data flows. In such an embodiment, a spike in such flows may represent a potential DoS attack. Examples of cluster comparison 322 are discussed below relative to FIGS. 4A and 4B. Detection of a potential anomaly at step 324 by comparison 322 may result at step 326 in initiation of a high-complexity AD algorithm such as a heavy hitter detection algorithm. Otherwise, the intermediate-stage processing of FIG. 3 continues by incrementing the iterator i at step 328 and continuing to receive the netflow data at step 304.

The method 300 illustrated in the embodiment of FIG. 3 allows for low-complexity processing using a relatively small amount of data during normal operation of the network. Such processing can detect (324) potential anomalies in the network and initiate (326) higher-complexity AD algorithms, such as heavy hitter detection algorithms, when the network appears to be experiencing an anomalous event. Such intermediate-stage processing preserves computational and memory resources for times when higher-complexity AD algorithms are likely to be able to detect and mitigate anomalies.

Figure 4A:
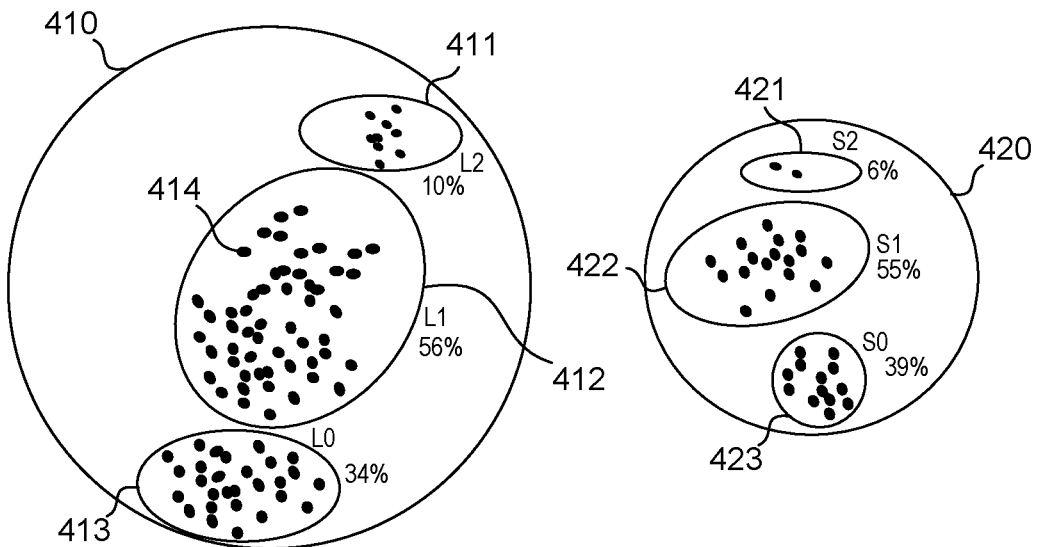
FIG. 4A illustrates exemplary short-term and long-term cluster distributions that may indicate the presence of no potential network anomalies.

FIG. 4A illustrates exemplary short-term (420) and long-term (410) cluster distributions that may indicate that no potential network anomalies exist in the network. Each dot 414 in FIG. 4A corresponds to a 3-tuple. Thus, in the illustrated embodiment, the data may be clustered in 3-dimensional space, although for ease of illustration the data is shown in 2-dimensions. As illustrated in FIG. 4A, the long-term cluster distribution 410 contains more 3-tuples 414 than the short-term cluster distribution 420 because the long-term bucket comprises the 3-tuples in the short-term bucket in addition to the 3-tuples in a plurality of older buckets.

In the illustrated embodiment, the 3-tuples 414 may be classified into a plurality of clusters according to their distance to a pre-determined centroid. In one embodiment, three centroids form three clusters 411-413 for the long-term data: L0 (413) having "centroid" of (0, 0, 0), L1 (412) having a centroid of (d-mean, p-mean, o-mean), and L2 (411) having a "centroid" of (1, 1, 1). Note that, because the normalized data in some embodiments cannot be greater than (0, 0, 0) or (1, 1, 1), those points are not true cluster centroids, those points may nevertheless form an initial point around which clusters may form. The values (d-mean, p-mean, o-mean) for the long-term data may be calculated using long-term data from the previous long-term bucket, rather than from the current long-term bucket which includes bucket i.

Standard clustering algorithms may be applied to assign the 3-tuples 414 to one of the three clusters. However, the size of the clusters is not likely to be equal. For example, the cluster L1 (412) is likely to have the most 3-tuples because it encompasses the average flows in the network. The clusters L0 (413) and L2 (411) represent outlier flows and thus are likely to have fewer 3-tuples assigned to them. For similar reasons, the cluster L1 (412) may be assumed to encompass a larger volume than clusters L0 (413) and L2 (411).

Similarly, in one embodiment, three centroids form three clusters 421-423 for the short-term data: S0 (423) having centroid of (0, 0, 0), S1 (422) having a centroid of (d-mean, p-mean, o-mean), and S2 (421) having a centroid of (1, 1, 1). The values (d-mean, p-mean, o-mean) for the short-term data may be calculating using short-term data from the previous short-term bucket (i.e., bucket i−1 in the illustrated embodiment), rather than from the current short-term bucket (i.e., bucket i in the illustrated embodiment). As with the long-term cluster distribution 410, the average-based cluster S1 (422) is likely to have the most 3-tuples 414 and may encompass a larger volume than outlier clusters S0 (423) and S2 (421).

As discussed above relative to FIGS. 2 and 3, an intermediate stage may compare the short-term (420) and long-term (410) cluster distributions to determine whether a potential anomaly exists in the network. For example, the intermediate stage may compare the percentage of flows in the lowest cluster S0 (423) of the short-term bucket with the percentage of flows in the lowest cluster L0 (413) of the long-term bucket. The intermediate stage may also consider the number of flows in the current short-term bucket (TS-current) compared to the number of flows in the previous short-term bucket (TS-previous). For example, a DoS anomaly may be detected when (TS-current>>TS-previous)&&(S0>>L0).

That is, a DoS anomaly may be detected when the current short-term bucket contains many more flows than the previous short-term bucket and the number of flows in the short-term bucket S0 (423) is significantly more than the number of flows in the long-term bucket L0 (413). In examples, one value may be significantly more than another when a difference between the two values exceeds a threshold or when a ratio of the first value to the second exceeds a threshold.

Similarly, a wide-spread download anomaly may be detected when (TS-current>>TS-previous)&&(S2>>L2).

That is, a wide-spread download anomaly may be detected when the current short-term bucket contains many more flows than the previous short-term bucket and the number of flows in the short-term bucket S2 (421) is significantly more than the number of flows in the long-term bucket L2 (411). For example, if S2 (421) contains >15 percentage points more clusters than L2 (411), then S2 (421) may be observed as having significantly more flows than L2 (411). In such a case, the short-term trend may be observed as diverging from the long-term trend.

Returning to FIG. 4A, one may observe that S0 (423) contains 39% of short-term flows, and L0 (413) contains 34% of long-term flows. Thus, S0 (423) is not significantly more than L0 (423) and there is not likely to be a DoS anomaly in the network during the time segment corresponding to the short-term bucket. Furthermore, S2 (421) contains 6% of short-term flows, and L2 (411) contains 10% of long-term flows. Thus, S2 (421) is not significantly more than L2 (411) and there is not likely to be a wide-spread download anomaly in the network during the time segment corresponding to the short-term bucket.

The use of three clusters in FIG. 4A is illustrative, and the present disclosure is not limited to using three clusters. The use of more than three clusters may advantageously provide higher accuracy in the detection of potential anomalies.

Figure 4B:
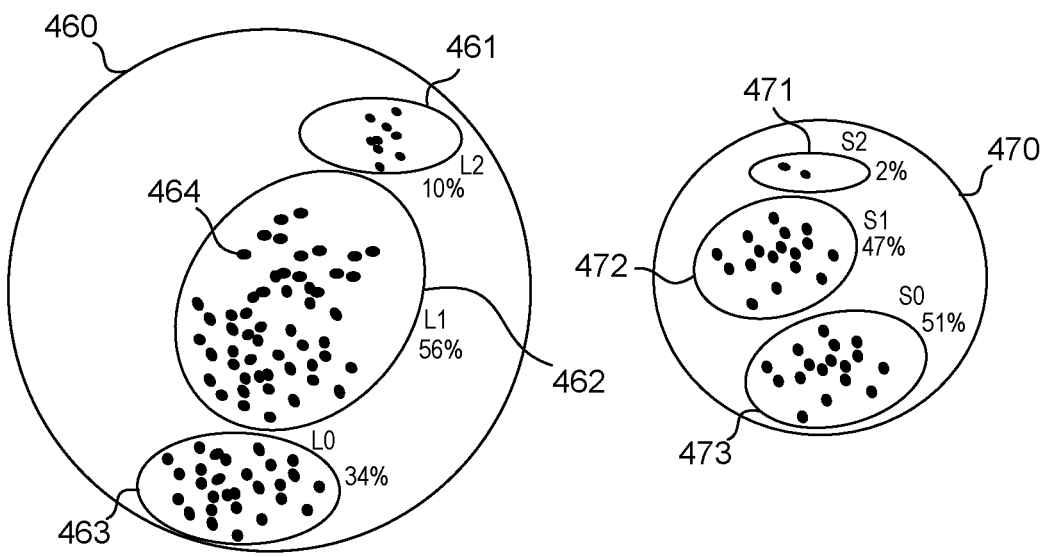
FIG. 4B illustrates exemplary short-term and long-term cluster distributions that may indicate the presence of a potential denial-of-service anomaly.

FIG. 4B illustrates exemplary short-term (470) and long-term (460) cluster distributions that may indicate the presence of a potential denial-of-service anomaly. The long-term cluster distribution 460 in FIG. 4B is identical to the long-term cluster distribution 410 in FIG. 4A. However, the short-term cluster distribution 470 in FIG. 4B is different than the short-term cluster distribution 420 in FIG. 4A.

Specifically, S0 (473) contains 51% of short-term flows, compared to L0 (463) which contains 34% of long-term flows. Comparing these two values indicates an increase in 17 percentage points, indicating that S0 >>L0. If a comparison also shows that TS-current >>TS-previous, then a potential DoS anomaly may be detected and a high-complexity AD algorithm such as a heavy hitter detection algorithm may be initiated.

CONCLUSION

Each of the blocks and modules in FIGS. 1-3 may be implemented in hardware, software, firmware, or any combination thereof.

Each of the blocks and modules in FIGS. 1-3 may be implemented on the same or different computing devices. Such computing devices can include, but are not limited to, a personal computer, a mobile device such as a mobile phone, workstation, embedded system, game console, television, set-top box, or any other computing device. Further, a computing device can include, but is not limited to, a device having a processor and memory, including a non-transitory memory, for executing and storing instructions. The memory may tangibly embody the data and program instructions. Software may include one or more applications and an operating system. Hardware can include, but is not limited to, a processor, memory, and graphical user interface display. The computing device may also have multiple processors and multiple shared or separate memory components. For example, the computing device may be a part of or the entirety of a clustered computing environment or server farm.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present embodiments should not be limited by any of the above-described examples, but should be defined only in accordance with the following claims and their equivalents.

While the invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

What is claimed is:

1. A computer implemented method, comprising:
    receiving flow data for a network flow;
    parsing the flow data into a plurality of time buckets;
    extracting a plurality of tuples describing the flow data, the tuple comprising a time duration of the network flow and information identifying an amount of data transmitted during the flow;
    calculating a long-term trend based at least in part on at least a first tuple and two or more time buckets of the plurality of time buckets including assigning the first tuple to a long-term cluster of a plurality of long-term clusters;
    calculating a short-term trend based at least in part on a second tuple and a most recent time bucket of the plurality of time buckets including assigning the second tuple to a short-term cluster of a plurality of short-term clusters;
    determining that the short-term trend diverges from the long-term trend to detect a potential network anomaly by determining that a percentage of tuples in a short-term cluster relative to other short-term clusters is significantly more than a percentage of tuples in a long-term cluster, corresponding to the short-term cluster, relative to other long-term clusters; and when the potential network anomaly is detected, initiating a heavy hitter detection algorithm.

2. The method of claim 1, further comprising assigning one or more tuples of the plurality of tuples to a time bucket.

3. The method of claim 2, wherein calculating the long-term trend comprises forming a long-term bucket comprising tuples assigned to at least one of the two or more buckets.

4. The method of claim 3, wherein calculating the long-term trend further comprises normalizing the first tuple relative to other tuples in the long-term bucket.

5. A system, comprising:
a memory; and
at least one processor coupled to the memory and configured to:
receive flow data for a network flow;
parse the flow data into a plurality of time buckets;
extract a plurality of tuples describing the flow data, wherein a tuple comprises a time duration of the network flow and information identifying an amount of data transmitted during the flow;
calculate a long-term trend based at least in part on at least a first tuple and two or more time buckets of the plurality of time buckets including assigning the first tuple to a long-term cluster of a plurality of long-term clusters;
calculate a short-term trend based at least in part on a second tuple and a most recent time bucket of the plurality of time buckets including assigning the second tuple to a short-term cluster of a plurality of short-term clusters;
determining that the short-term trend diverges from the long-term trend to detect a potential network anomaly by determining that a percentage of tuples in a short-term cluster relative to other short-term clusters is significantly more than a percentage of tuples in a long-term cluster, corresponding to the short-term cluster, relative to other long-term clusters; and
when the potential network anomaly is detected, initiate a heavy hitter detection algorithm.

6. The system of claim 5, wherein the at least one processor is further configured to assign one of more tuples of the plurality of tuples to a time bucket.

7. The system of claim 6, wherein the at least one processor is configured to calculate the long-term trend by forming a long-term bucket comprising tuples assigned to at least one the two or more buckets.

8. The system of claim 7, wherein the at least one processor is further configured to calculate the long-term trend by normalizing the first tuple relative to other tuples in the long-term bucket.

9. A non-transitory computer-readable medium having instructions stored thereon that, when executed by at least one computing device, causes the at least one computing device to perform operations comprising:
receiving flow data for a network flow;
parsing the flow data into a plurality of time buckets;
extracting a plurality of tuples describing the flow data, wherein a tuple comprises a time duration of the network flow and information identifying an amount of data transmitted during the flow;
calculating a long-term trend based at least in part on at least a first tuple and two or more time buckets of the plurality of time buckets including assigning the first tuple to a long-term cluster of a plurality of long-term clusters;
calculating a short-term trend based at least in part on a second tuple and a most recent time bucket of the plurality of time buckets including assigning the second tuple to a short-term cluster of a plurality of short-term clusters;
determining that the short-term trend diverges from the long-term trend to detect a potential network anomaly by determining that a percentage of tuples in a short-term cluster relative to other short-term clusters is significantly more than a percentage of tuples in a long-term cluster, corresponding to the short-term cluster, relative to other long-term clusters; and
when the potential network anomaly is detected, initiating a heavy hitter detection algorithm.

10. The non-transitory computer-readable medium of claim 9, the instructions further comprising assigning on or more tuples of the plurality of tuples to a time bucket.

11. The non-transitory computer-readable medium of claim 10, wherein calculating the long-term trend comprises forming a long-term bucket comprising tuples assigned to at least one of the two or more buckets.

12. The non-transitory computer-readable medium of claim 11, wherein calculating the long-term trend further comprises normalizing the first tuple relative to other tuples in the long-term bucket.

* * * * *